United States Patent [19]
DiNicola et al.

[11] Patent Number: 5,315,701
[45] Date of Patent: May 24, 1994

[54] METHOD AND SYSTEM FOR PROCESSING GRAPHICS DATA STREAMS UTILIZING SCALABLE PROCESSING NODES

[75] Inventors: Paul D. DiNicola, Hurley; Joseph Kantz, Saugerties; Omar M. Rahim, Kingston; David A. Rice, New Paltz; Edward M. Ruddick, Woodstock, all of N.Y.

[73] Assignee: International Business Machines Corporation, Armonk, N.Y.

[21] Appl. No.: 926,724

[22] Filed: Aug. 7, 1992

[51] Int. Cl.⁵ .............................................. G06F 3/14
[52] U.S. Cl. ...................................... 395/163; 395/162
[58] Field of Search .............................. 395/162–164, 395/650; 371/10.1, 40.1; 364/200 MS, 900 MS

[56] References Cited

U.S. PATENT DOCUMENTS

| | | | |
|---|---|---|---|
| 4,811,214 | 3/1989 | Nosenchuck et al. | 364/200 |
| 4,850,027 | 7/1989 | Kimmel | 382/49 |
| 4,866,637 | 9/1989 | Gonzalez-Lopez et al. | 340/747 |
| 4,876,644 | 10/1989 | Nuechterlein et al. | 364/200 |
| 4,888,682 | 12/1989 | Ngai et al. | 364/200 |
| 4,967,343 | 10/1990 | Ngai et al. | 364/200 |
| 5,077,736 | 12/1991 | Dunphy, Jr. et al. | 371/40.1 |
| 5,179,637 | 1/1993 | Nardozzi | 395/163 |

FOREIGN PATENT DOCUMENTS

| | | | |
|---|---|---|---|
| 0303361A2 | 2/1989 | European Pat. Off. | G06F 15/72 |
| 0450658A2 | 10/1991 | European Pat. Off. | G06F 9/38 |
| 62-137669 | 6/1987 | Japan | G06F 15/62 |
| 63-86079 | 4/1988 | Japan | G06F 15/60 |
| 63-157276 | 6/1988 | Japan | G06F 15/66 |
| 2-266458 | 10/1990 | Japan | G06F 15/18 |

Primary Examiner—Dale M. Shaw
Assistant Examiner—Kee M. Tung
Attorney, Agent, or Firm—Mark S. Walker; Duke W. Yee; Andrew J. Dillon

[57] ABSTRACT

The data processing system includes processing nodes and a graphics display device for processing a graphics data stream. The data processing system partitions a graphics data stream into a data segments or work groups for processing by the processing nodes. Next, the data segments are distributed for processing to the processing nodes. In response to receiving a data segment at a processing node, the data segment is processed to produce a processed data segment. The processed data segments are recombined into a processed graphics data stream. This processed graphics data stream is coupled to the graphics display device.

22 Claims, 7 Drawing Sheets

METHOD AND SYSTEM FOR PROCESSING GRAPHICS DATA STREAMS UTILIZING SCALABLE PROCESSING NODES

BACKGROUND OF THE INVENTION

1. Technical Field

The present invention relates in general to a method and system for improved graphical computation and in particular to a method and system for utilizing graphical computation to process a data stream. Still more particularly, the present invention relates to a method and system of graphical computation to efficiently process a graphics data stream.

2. Description of the Related Art

Data processing systems such as personal computers and work stations are commonly utilized to run computer-aided design ("CAD") applications, computer-aided manufacturing ("CAM") applications, and computer-aided software engineering ("CASE") tools. Engineers, scientists, technicians, and others employ these applications daily. These applications involve complex calculations, such as finite element analysis, to model stress in structures. Other applications include chemical or molecular modelling applications. CAD/CAM/CASE applications are normally graphics intensive in terms of the information relayed to the user. Other data processing system users may employ other graphics intensive applications such as desk top publishing applications. Generally, users of these applications require and demand that the data processing systems be able to provide extremely fast graphics information.

The processing of graphics data streams to provide a graphical display on a video display terminal requires an extremely fast graphics processing system in order to provide a display with a rapid response. It is desirable to be able to provide the performance required utilizing the present technology without having to change the microcode in a data processing system. In order to meet the performance demands of users employing graphics applications, multiple floating point processors have been utilized to provide the computational power needed for higher performance.

Two basic approaches are presently available for providing extremely fast graphics. One approach for providing fast graphics is a series or "pipeline" approach. Under a pipeline approach, a number of processors are serially coupled to form a "pipeline" for processing the graphics data stream. The work load is then apportioned between the processors in the pipeline. This approach requires that the interface between each processor in the pipeline be able to transfer the entire data stream. In addition, the balancing of work across more than three or four processors in a pipeline is difficult. Often times, one or more processors may be idle because of uneven distribution of tasks over the individual processors.

Another approach involves a parallel processor architecture. All of the processors in a parallel processing architecture must be able to access a common input stream, resulting in the input bus becoming the bottleneck in such a system. Another problem associated with this approach is that when multiple processors are connected together, it is difficult to obtain sufficient bandwidth into and out of a shared memory configuration. Additionally, breaking up the input data streams, which are essentially serial, into a format for parallel processing is also a problem for a multiple tier parallel processing system. More specifically, breaking up a data stream into parallel pieces introduces problems with synchronization, i.e., maintaining temporal order, and the problems arising from the processing of graphics attributes, which must be serially processed.

As a result, an inefficient usage of processing power may occur with either of the presently available systems. Therefore, it would be desirable to have a method and system in a graphical processing system to efficiently process graphics data streams.

SUMMARY OF THE INVENTION

It is therefore one object of the present invention to provide a method and system for improved graphical computation.

It is another object of the present invention to provide a method and system for utilizing graphical computation to process a data stream.

It is yet another object of the present invention to provide a method and system of graphical computation to efficiently process a graphics data stream.

The foregoing objects are achieved as is now described. The present invention provides a method and system in a data processing system for processing a graphics data stream. The data processing system includes processing nodes and a graphics display device. The data processing system partitions a graphics data stream into a data segments or work groups for processing by the processing nodes. Next, the data segments are distributed for processing to the processing nodes. In response to receiving a data segment at a processing node, the data segment is processed to produce a processed data segment. The processed data segments are recombined into a processed graphics data stream. This processed graphics data stream is coupled to the graphics display device.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
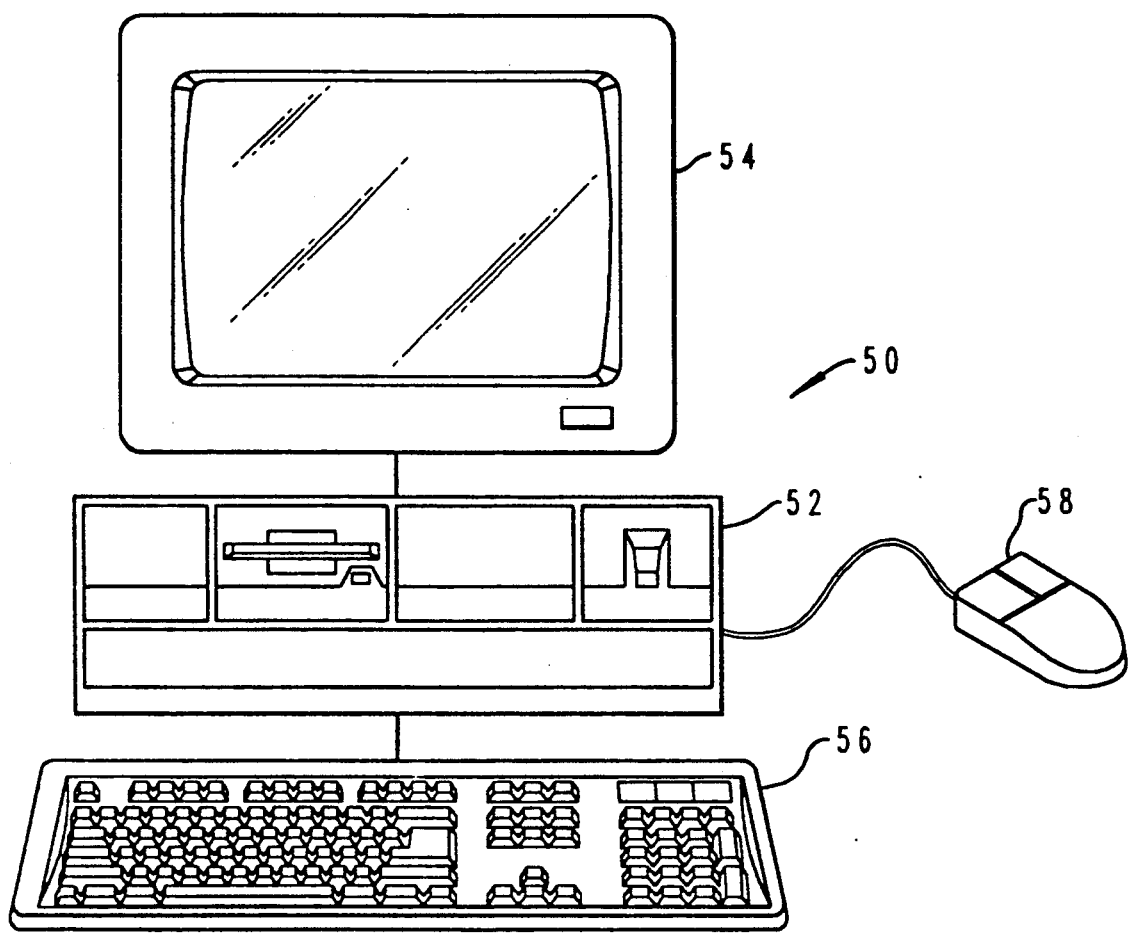
FIG. 1 depicts a pictorial representation of a computer system in which the present invention may be implemented in accordance with a preferred embodiment of the present invention.

With reference now to the figures and in particular with reference to FIG. 1, there is depicted a pictorial representation of a computer system in which the present invention may be implemented in accordance with a preferred embodiment of the present invention. A computer 50 is depicted which includes a system unit 52, a video display terminal 54, a keyboard 56, and a mouse 58. Computer 50 may be implemented utilizing any suitable computer such as an IBM PS/2 computer, an IBM RISC System/6000 computer, both products of International Business Machines Corporation. RISC System/6000 is a trademark of International Business Machines and PS/2 is a registered trademark of International Business Machines Corporation. A preferred embodiment of the present invention may be implemented in other types of data processing systems, such as for example, intelligent work stations or mini-computers.

Figure 2:
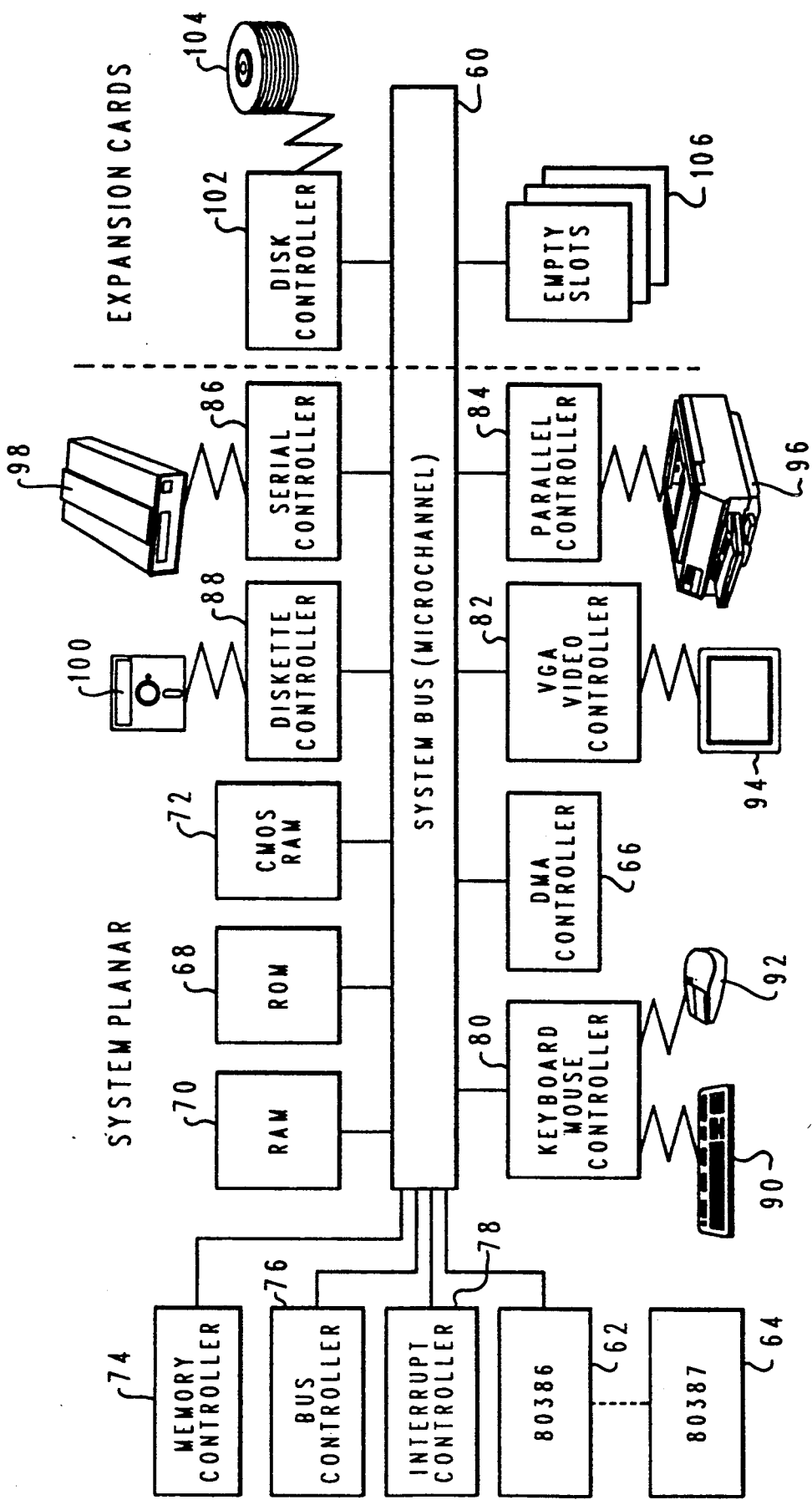
FIG. 2 is a block diagram of selected components in a personal computer in which a preferred embodiment of the present invention may be implemented.

Referring now to FIG. 2, there is depicted a block diagram of selected components in computer 50 in which a preferred embodiment of the present invention may be implemented. System unit 52 preferably includes a system bus 60 for interconnecting and establishing communication between various components in system unit 52. Microprocessor 62 is connected to system bus 60 and may also have numeric coprocessor 64 connected to it. DMA controller 66 is also connected to system bus 60 and allows various devices to appropriate cycles from microprocessor 62 during large I/O transfers.

Read only memory ("ROM") 68 is mapped into the microprocessor 62 address space in the range from 640K to 1 megabyte. Read Only Memory ("ROM") 68 and Random Access Memory ("RAM") 70 are also connected to system bus 60. ROM 68 contains the power-on self test ("POST") and the Basic Input/Output System ("BIOS") which control hardware operations, such as those involving disk drives and the keyboard. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output ("I/O") controllers such as: keyboard and mouse controller 80, video controller 82, parallel controller 84, serial controller 86, and diskette controller 88. Keyboard and mouse controller 80 provides a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards may also be added to system bus 60, such as disk controller 102, which provides a hardware interface for hard disk unit 104. Empty slots 106 are provided so that other peripherals, adapters, and devices may be added to system unit 52. A preferred embodiment of the present invention may be added to system unit 52 in the form of a graphics adapter placed into empty slots 106.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like may also be utilized in addition to or in place of the hardware already depicted.

In accordance with a preferred embodiment of the present invention, processors may be arranged in parallel pipelines to form processing nodes. These processing nodes are utilized to perform the bulk of the graphics computations for a data processing system. The processors receive data from input communications paths and perform required computations, such as transformations, clipping, lighting, etc. Each processor in a processing node passes intermediate data to the following processor to allow it to continue the calculations. This allows the computations to be spread among the processors within a processing node. Each processor may have its own memory, and the communications paths are designed to allow data movement to occur without impacting the ability of the processors to access their code and data memory in accordance with a preferred embodiment of the present invention.

Figure 3:
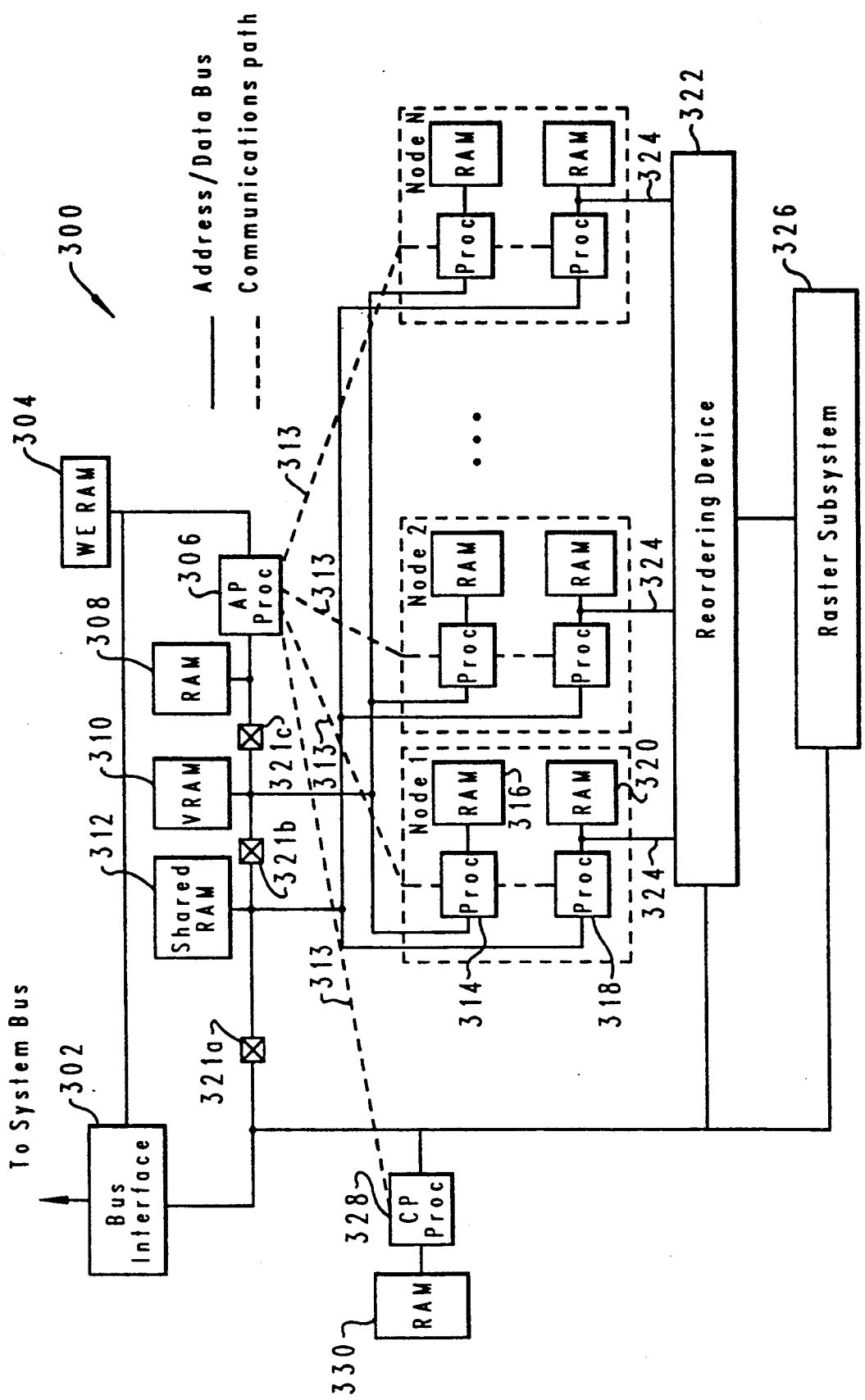
FIG. 3 depicts a block diagram of a nodal processor structure constructed in accordance with a preferred embodiment of the present invention.

With reference to FIG. 3, there is depicted a block diagram of a nodal processor structure 300 constructed in accordance with a preferred embodiment of the present invention. Nodal processing structure 300 receives one or more graphics data streams through bus interface 302, which is coupled to the system bus of the data processing system utilizing presently available techniques well known to those skilled in the art. A graphics data stream may be divided up or partitioned into Work Elements. A Work Element ("WE") may be (1) a drawing primitive, which is a command to draw, i.e., a line, a polygon, a triangle, or text; (2) an attribute primitive, which is a command to change an attribute, also called an attribute change, i.e. color or line style, or (3) a context primitive, which is context information for an area of display or a window.

The graphics data stream may be stored in WE RAM 304. Attribute Processor ("AP") 306 is utilized to parse or partition the data stream into multiple segments in accordance with a preferred embodiment of the present invention. Each segment is also called a Work Group ("WG"), and each WG may contain one or more WE's. The number of WE's in a WG may be determined by various factors such as the amount of processing time that it takes to process a WG versus the amount of processing time it takes to group WE's into a WG. AP 306 is coupled to RAM 308, which is employed to store various instructions or data utilized by AP 306. Additionally, AP 306 may move data by utilizing other devices such as DMA controllers, processors, or with internal features within AP 306 itself. AP 306 may perform graphics processing and supply current attribute data to the processing nodes along with the work to be done.

Video RAM ("VRAM") 310 stores attribute information, in the form of processed attribute primitives, from the data stream along with font information and other context related data in accordance with a preferred embodiment of the present invention. AP 306 copies attribute data from the graphics data stream into VRAM 310. Shared RAM 312 is utilized to store font and context data. Both VRAM 310 and Shared RAM 312 are shared memory areas utilized for storing globally accessed data, such as graphics context information, fonts, and attribute data. This type of memory may be accessible by all of the processors, but is accessed relatively infrequently. As a result, contention for bus access to this type of memory has minimal impact on performance.

AP 306 distributes WG's to the following processing nodes: Node 1, Node 2 through Node N through communications path 313. Communications path 313 is utilized for passing data between the processors in accordance with a preferred embodiment of the present invention. These communications paths may be memory ports, or any type of hardware well known to those skilled in the art that provides a data path to another processor. Each of the processing nodes includes processor 314 coupled to RAM 316, and processor 318 coupled to RAM 320. Processor 314 and processor 318 are serially coupled to each other. Processors 314 and 318 are TMS320C40 processors manufactured by Texas Instruments Incorporated in accordance with a preferred embodiment of the present invention. Information on programming and utilizing TMS320C40 processors may be found in *TMS320C4x User's Guide* available from Texas Instruments Incorporated. RAM 316 and RAM 320 are utilized to store instructions and data for processor 314 and processor 318 respectively.

The number of processing nodes may vary in accordance with a preferred embodiment of the present invention. Although the depicted embodiment shows only two processors per processing node, it is contemplated that other numbers of processors may be utilized in each processing node. Additionally, if more than one processor is in a processing node, it is not necessary that all of the processors in the processing node be of the same type or make.

AP 306 may be coupled to the processing nodes via a communications path that may be a FIFO, a shared memory area, a communications port (serial or parallel), or any other type of processor to processor communications path well known in the art. Additionally, each processor in a processing node may have a similar communication path to the processor located below it in a processing node. In any event, the coupling of processors to each other may be achieved through techniques well know in the art. In the depicted embodiment, the processors are connected to each other through standard communications ports found in the TMS320C40.

The processing nodes are separated by bus transceivers 321a, 321b, and 321c, which are well known in the art. These bus transceivers control access to VRAM 310 and Shared RAM 312 by the processing nodes. Closing the bus transceivers creates a single bus, while opening the bus transceivers creates two buses. When the bus transceivers are all open, processor 318 in Node 1, Node 2, and Node N has access to Shared RAM 312, while processor 314 in Node 1, Node 2, and Node N has access to VRAM 310. Closing all of the bus transceivers results in all of the processors in the processing nodes being able to access both Shared RAM 312 and VRAM 310. Although only three bus transceivers and one Shared RAM and one VRAM are shown in the depicted embodiment, other numbers of bus transceivers and various numbers and types of RAM may be utilized in accordance with a preferred embodiment of the present invention.

As WG's are processed within the processing nodes, the processed WG's are sent from the processing nodes to Reordering Device 322 via bus 324, which is also utilized by the processors to access RAM 320. In this particular embodiment, Reordering Device 322 is an application specific integrated circuit ("ASIC"). Reordering Device 322 may be another processor or some other specialized logic circuit to recombine the processed WG's well known in the art in accordance with a preferred embodiment of the present invention. Processed WG's are recombined to produce a processed graphics data stream, which is sent to Raster Subsystem 326, which may be an specialized ASIC or a processor, for display on a video display terminal. The reordering or recombining of the processed WG's may be accomplished by assigning tags or sequence numbers to each WG's in accordance with a preferred embodiment of the present invention. Reordering Device 322 would utilize the synchronization tags to determine the order in which to place WG's to produce a data stream.

In some cases, the order in which WG's are placed may be extremely important, and in other cases, the order of WG's may be unimportant. As a result, in addition to dividing up a graphics data stream into segments, AP 306 may be utilized to determined the order in which the segments are reordered or reassembled at Reordering Device 322 in accordance with a preferred embodiment of the present invention. Furthermore, AP 306 determines whether or not the order of a WG is important and may assign synchronization tags or sequence numbers to each WG in accordance with a preferred embodiment of the present invention. This determination may be dependent on various factors such as the type of graphics data stream being processed. These synchronization tags or sequence numbers are utilized by Reordering Device 322 to determine the order in which to send processed graphics data to Raster Subsystem 326 in accordance with a preferred embodiment of the present invention. WG's which do not require any temporal order may be assigned the same synchronization tag or sequence number.

A graphics data stream may be multiplexed that is it may contain two or more graphics data formats with each graphic data format being in the form of a graphics data stream that forms the multiplexed graphics data stream. A multiplexed graphics data stream may also contain two or more data streams of the same format. The Reordering Device and AP may be programmed to process various graphics data streams in a multiplexed graphics data stream, utilizing selective grouping of nodes in accordance with a preferred embodiment of the present invention. This may be utilized when the context switch time, the time to switch from one graphics data stream to another, is a bigger factor than the data stream processing load factor. Also, this selective feature may be utilized when on-line diagnostics detects one or more defective nodes in accordance with a preferred embodiment of the present invention.

In addition, a control processor ("CP") 328 is coupled to RAM 330, which is utilized by CP 328 to store information and hold instructions. CP 328 is coupled to AP 306, Reordering Device 322, and Raster Subsystem 326. CP 328 is utilized to manage Raster Subsystem 326 and bus interface 302. CP 328 also assists in rendering operations such as some bit block transfer ("BitBLt") operations, which involve copying a block of bits from one place to another; i.e., screen to screen, screen to system, or system to screen. For BitBLT operations, CP 328 controls Raster Subsystem 326 and bus interface 302 and sets up DMA operations for the BitBLT.

AP 306 reads work from an input FIFO, memory or other input path and moves WG's to the appropriate processing node. This processor is also responsible for operations such as including a sequence number with the WG's so that the WG's may be reordered after processing by the processing nodes. Also, for some graphics data streams, the processor may perform display list processing and non-drawing processing.

Utilizing a processor, such as AP 306, to dispatch data to the processing nodes, in accordance with a preferred embodiment of the present invention, avoids having the top processors in the processing nodes contend for a shared input resource. Consequently, the time during which processors are stalled waiting for a resource may be reduced.

Normally, graphics attributes are required to be processed in a sequential manner. Moreover, in addition to reducing idle time in the processors, the AP allows for the processing of attributes to be accomplished serially. Furthermore, before a WE may be executed, all prior attributes that affect a particular WE should have been processed. Also, some WE's may contain attribute changes that affect later WE's. As a result, parallel processing of WE's are difficult, since a processor in a parallel architecture cannot start processing a WE until all of the previous attributes, including those in previous WE's, have been processed. On the other hand, in accordance with a preferred embodiment of the present invention, having the AP perform the attribute processing allows for the dispatching of multiple WE's, as long as the AP is able to process the attribute quickly enough to stay ahead of the processing nodes. This is possible since attribute processing time is generally less than the time required to process WE's. As a result, the AP is normally able to stay ahead of the processing nodes processing concurrently in most cases.

Another benefit of the present invention is that this architecture is efficient at processing various well known graphics data formats such as GL, PHIGS, X Windows, and 5080. A multiplexed graphics data stream may contain two or more graphics data streams with each graphics data stream having a different graphics data format. For example, a graphics data stream may include a GL data stream and a PHIGS data stream. Additionally, a graphics data stream may, for example, contain two GL data streams.

Figure 4:
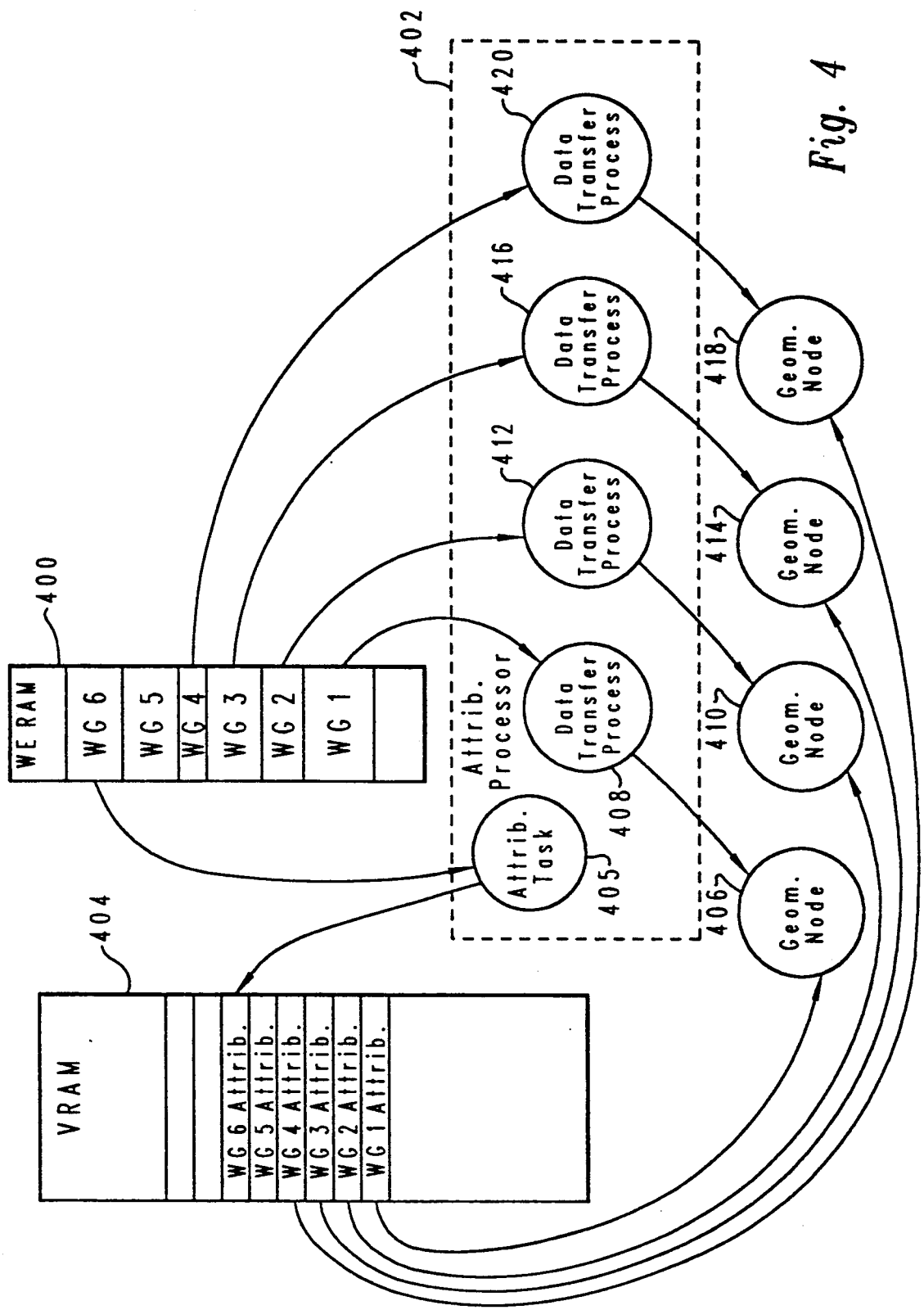
FIG. 4 is a block diagram illustrating an attribute processor dispatching Work Groups to processing nodes for processing in accordance with a preferred embodiment of the present invention.

Referring now to FIG. 4, there is depicted a block diagram illustrating an attribute processor dispatching WG's to processing nodes for processing in accordance with a preferred embodiment of the present invention. Data from a graphics data stream is stored in WE RAM 400. Attribute processor ("AP") 402 partitions data stream into WG's: WG 1, WG 2, WG 3, WG 4, WG 5, and WG 6. These WG's may be distributed or sent to the first available processing node in accordance with a preferred embodiment of the present invention. It is contemplated that other systems of distribution may also be utilized.

Additionally, AP 402 also searches for WE's that are attribute primitives or attribute changes in each WG, processes attribute primitive or attribute changes, and stores the processed attribute information in VRAM 404. This searching for WE's that are attribute primitives may be accomplished as AP 402 retrieves a WE from VRAM 404. In this example, the processed WE's that were attribute primitives for the WG's are WG 1 Attrib, WG 2 Attrib, WG 3 Attrib, WG 4 Attrib, WG 5 Attrib, and WG 6 Attrib. As illustrated, these attribute primitives are parsed out of the graphics data stream, processed, and then the processed attribute primitives are placed into VRAM 404 through attribute task process 405, which copies the processed attribute primitives into the VRAM 404. The first attribute information placed into VRAM 404 forms the initial attribute state, and this attribute state changes as more WE's containing attribute primitives are processed and placed into VRAM 404. The attribute state at any point after the initial attribute state is called the accumulated attribute state.

Each WG sent to a processing node includes the attribute primitives, unprocessed, associated with that WG. Moreover, each WG has a pointer associated with it pointing to the initial attribute states copied into VRAM 404. This allows each processing node to have access to all of the attributes that are in the in VRAM 404, allowing each WG to be processed in light of all the attribute primitives that have occurred before that WG. Otherwise, a processing node would have to wait for another processing node to finish in order to determine the current state of attributes defined by the attribute primitives.

For example, assume that a first WG contains WE's to draw three lines and change the color to blue, and a second WG includes WE's to draw three lines with no attribute data. The processing node processing the second WG would need to know that the three lines should be drawn in blue. Attaching a pointer to the accumulated attribute state stored in VRAM 404 allows for each processing node to determine what attribute changes have temporally occurred before.

In addition to forming WG's, AP 402 controls the transfer of WG's to the processing nodes. For example, AP 402 transfers WG 1 to Node 406 through data transfer process 408. WG 2 is transferred to Node 410 by data transfer process 412; WG 3 is transferred to Node 414 by data transfer process 416, and WG 4 is transferred to Node 418 by data transfer process 420. Each processing node processes the WG sent to it utilizing the attribute data stored in VRAM 404. This VRAM is a shared memory allowing all of the processing nodes to access it to obtain attribute information needed to correctly process each WG. After each WG is processed, the WG's are recombined to produce a processed graphics data stream that may be coupled to a graphics display device via a raster subsystem for display to the user in accordance with a preferred embodiment of the present invention.

Figure 5:
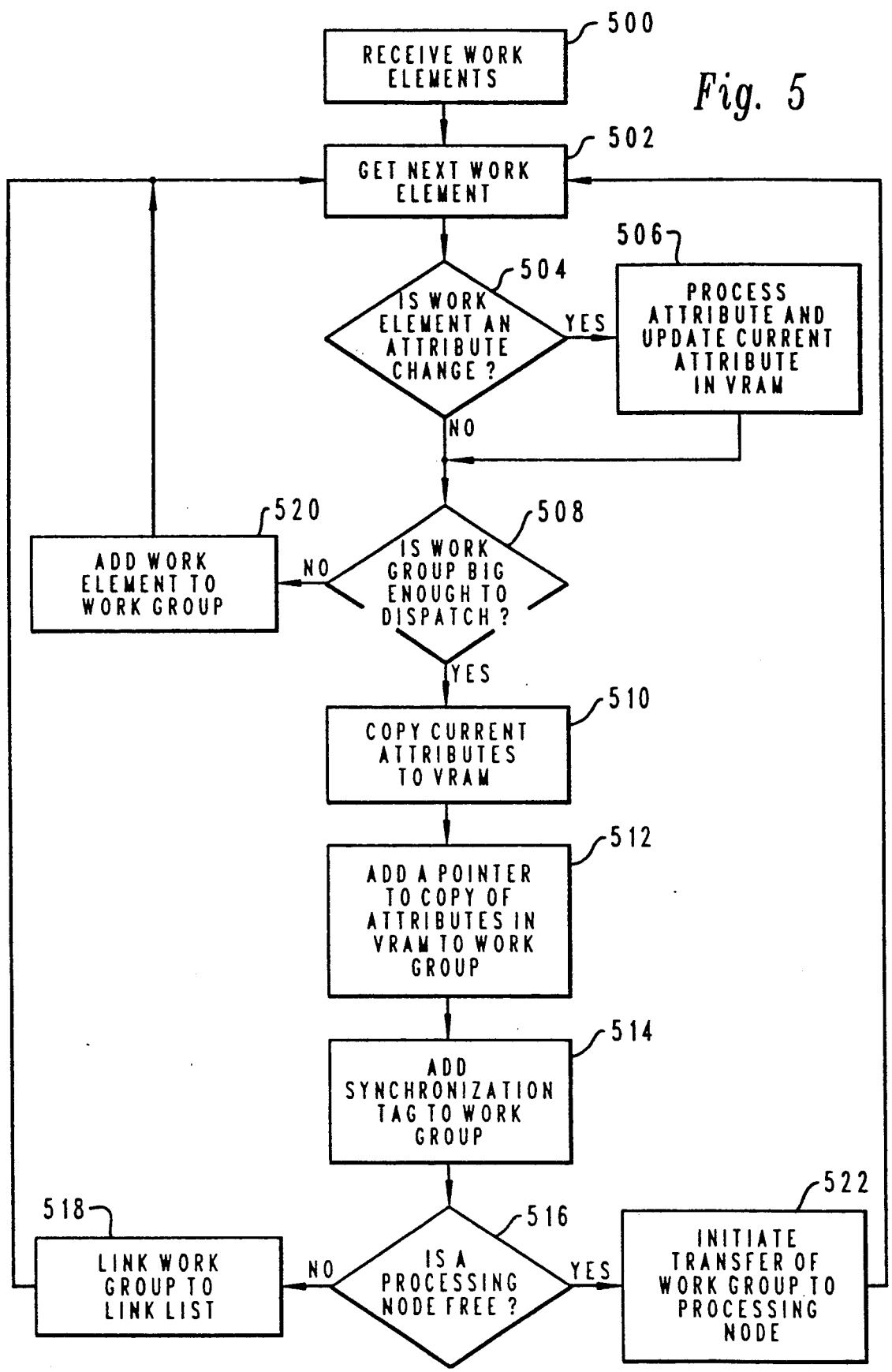
FIG. 5 depicts a high level flowchart of a method and system for dispatching Work Groups to processing nodes for processing in accordance with a preferred embodiment of the present invention.

With reference to FIG. 5, there is depicted a high level flowchart of a method and system for dispatching WG's to processing nodes for processing in accordance with a preferred embodiment of the present invention. This method and system may be implemented in a processor in the form of microcode to control the dispatching of WG's to the processing nodes in accordance with a preferred embodiment of the present invention. In accordance with a preferred embodiment of the present invention, the graphics data stream processed may actually contain multiple graphics data streams of the different types or of the same type. Multiplexed graphics data streams may be received and processed by a method and system of the present invention in accordance with a preferred embodiment of the present invention.

The process begins as depicted in block 500, which illustrates receiving WE's in the form of a graphics data stream. These WE's are stored in a WE RAM. Thereafter, the process proceeds to block 502, which depicts the retrieval of the next WE from the WE RAM. Next, the process proceeds to block 504, which illustrates a determination of whether or not the WE is an attribute primitive or an attribute change. If the WE is an attribute change, the process then proceeds to block 506, which depicts the processing of the attribute and the updating of the current attribute in the RAM.

Thereafter, the process proceeds to block 508, which illustrates a determination of whether or not the WG is big enough to dispatch to the processing nodes. Referring back to block 504, if the WE is not an attribute primitive or attribute change, the process proceeds directly to block 508. If the WG is large enough to dispatch to a processing node, the process then proceeds to block 510, which depicts the copying of the current attribute state to the VRAM. Next, the process proceeds to block 512, which illustrates the addition of a pointer to the copy of the attribute primitives in the VRAM to the WG. Afterwards, the process proceeds to block 514, which depicts the addition of a synchronization tag to the WG.

Next, block 516 depicts a determination of whether or not a processing node is free. If a processing node is not free, the process then proceeds to block 518, which depicts the linking of the WG to a link list. A link list contains a list of all of the WG's that have not been processed by a processing node. This list is utilized to distribute WG's to processing nodes as they become available for processing. Thereafter, the process returns to block 502.

Referring back to block 508, if the WG is not big enough to dispatch to a processing node, the process proceeds to block 520, which illustrates the addition of a WE to the WG, and thereafter, the process returns to block 502 to retrieve another WE.

Referring back to block 516, if a processing node is free, the process proceeds to block 522, which depicts the initiation of a transfer of a WG to the free processing node. Thereafter the process returns to block 506 to retrieve another WE.

Figure 6:
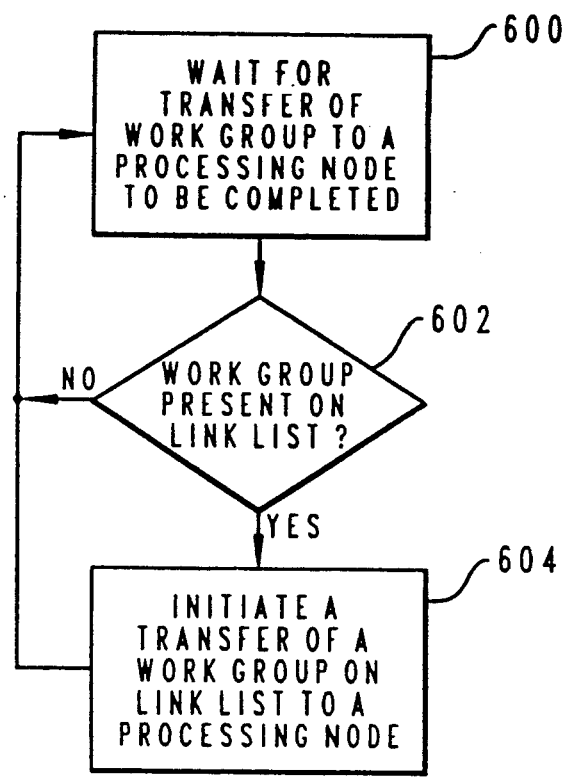
FIG. 6 is a high level flowchart of a method and system for dispatching work groups on a link list to processing nodes.

Referring now to FIG. 6, there is depicted a high level flowchart of a method and system for dispatching WG's on a link list to processing nodes. The process begins when an initiation of a transfer of a WG to a processing node is occurring in block 522 in FIG. 5. As illustrated, the process begins in block 600, which illustrates waiting for a transfer of a WG of a node to be completed. Thereafter, the process proceeds to block 602, which depicts a determination of whether or not a WG is present on the link list. If a WG is present on the link list, the process proceeds to block 604, which depicts the initiation of a transfer of a WG on a link list to a processing node. The transferring of WG's on a link list to processing nodes is accomplished on a first-in-first-out basis in accordance with a preferred embodiment of the present invention. Thereafter the process returns to block 600, and the entire cycle begins again. Referring back to block 602, if a WG is not present on the link list the process returns to block 600.

Figure 7:
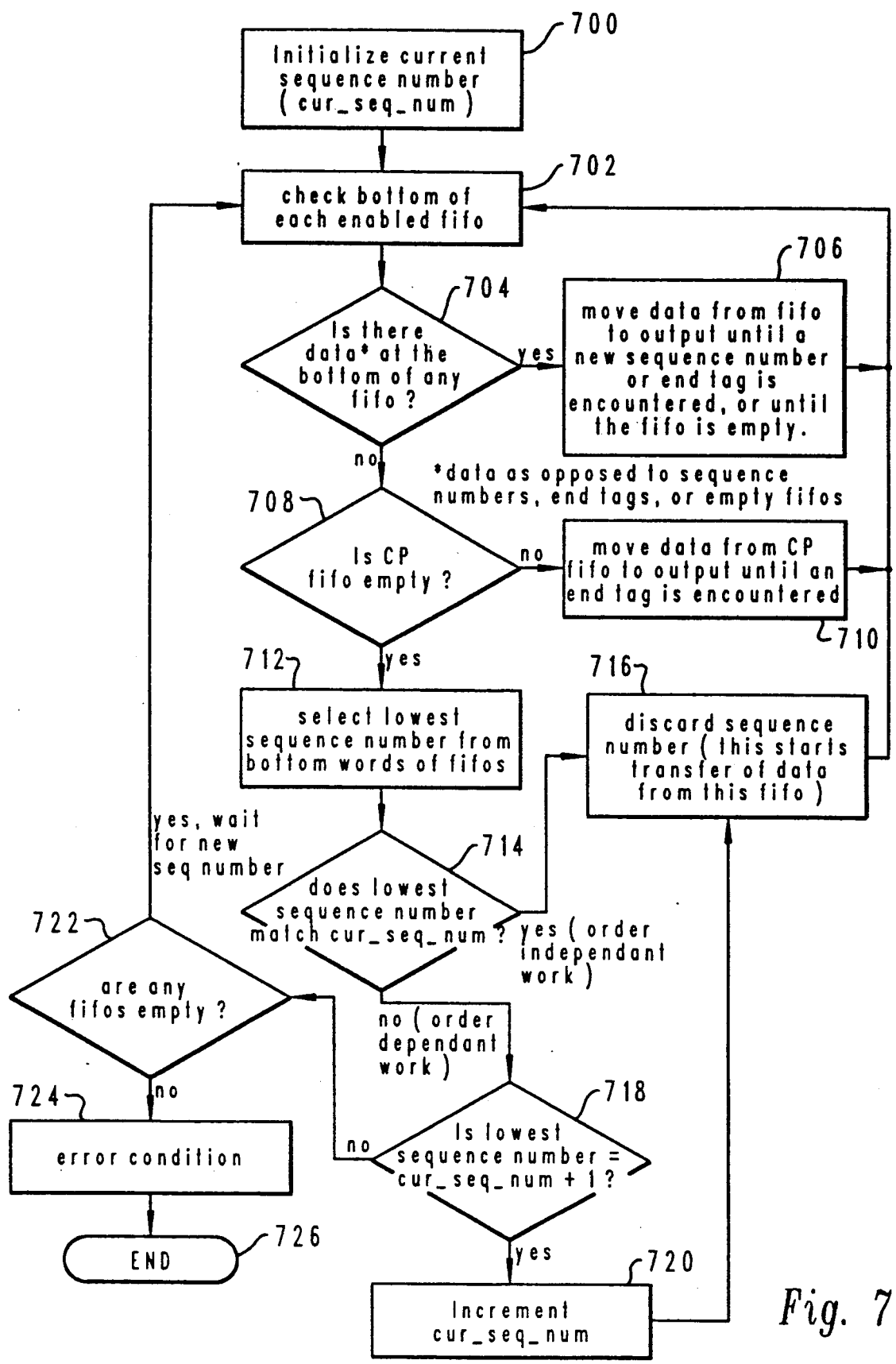
FIG. 7 depicts a high level flowchart of a method and system for recombining processed Work Groups.

With reference to FIG. 7, there is depicted a high level flowchart of a method and system for recombining processed WG's. The WG's from each processing node are placed into a first-in-first-out buffer ("fifo") to be recombined into a processed data stream, and each processing node is coupled to a fifo. The Reordering Devices reads data from the fifos one word at a time; a word may vary in size, such as, for example, 32 bits. The process begins as illustrated in block 700, which depicts the initialization of the current sequence number, cur_seq_num, which is set to some value, usually zero. Thereafter, the process proceeds to block 702, which illustrates the checking or scanning of the bottom of each fifo that is enabled. A fifo is enabled if WG's have been processed by the processing node associated with the fifo.

Next, the process proceeds to block 704, which depicts a determination of whether or not data is present at the bottom of any fifo. Data does not include sequence numbers or end tags. If data is present at the bottom of the fifo, the process proceeds to block 706, which illustrates the movement of data from a fifo to an output of the Reordering Device until a new sequence number or an end tag is encountered. Afterwards, the process returns to block 702.

Referring back to block 704, if no data is present at the bottom of any fifo, the process then proceeds to block 708, which depicts a determination of whether or not the CP fifo is empty. If the fifo is not empty the process proceeds to block 710, which illustrates the movement of data from the CP fifo to an output until an end tag is encountered. Thereafter the process returns to block 702.

Referring back to block 71 0, if the CP fifo is empty, the process proceeds to block 712, which depicts the selection of the lowest sequence number from the bottom words of the fifos for processing. Afterwards, the process proceeds to block 714, which illustrates a determination of whether or not the lowest sequence number matches cur_seq_num. If the lowest sequence number matches cur_seq_num, the work is order independent and the process proceeds to block 716, which depicts the discarding of the sequence number, which in turn starts the transfer of data from the fifo to the output of the Reordering Device. Thereafter, the process returns to block 702.

Referring back to block 714, if the lowest sequence number does not match the cur_seq_num, the work is order dependent and the process proceeds instead to block 718, which illustrates a determination of whether or not the lowest sequence number is equal to the cur_seq_num plus+1. If the lowest sequence number is equal to the cur_seq_num plus +1, the process then proceeds to block 720, which depicts the incrementing of the cur_seq_num by one. Thereafter the process proceeds to block 718, which illustrates the discarding of the sequence number, which starts the transfer of data to the output of the reordering device from the fifo. Thereafter, the process returns to block 702.

Referring again to block 718, if the lowest sequence number is not equal to the cur_seq_num+1, the process proceeds to block 722, which depicts a determination of whether or not any of the fifos are empty. If none of the fifos are empty, the process proceeds to block 724, which illustrates the sending of a message that an error condition occurs. Thereafter, the process terminates as illustrated in block 726. As a result, the process will have to be reinitialized.

Referring back to block 722, if one or more of the fifos are empty, the process returns to block 702.

The present invention provides an improved approach to combining many processors into a high performance graphics computation system by utilizing a processor for dispatching work to processing nodes. Additionally, data flow between processors is maintained in data paths separate from memory access, thereby avoiding memory bus bandwidth problems. Moving data across a data path more than once is also avoided, which reduces the bandwidth requirements in the interfaces. Further, a preferred embodiment in accordance with the present invention allows for a lower bandwidth in data paths in comparison to single pipeline serial processor systems since each processing node handles only 1/N of the data stream (where N is the number of processing nodes). In addition, the present invention avoids memory contention problems found in a shared memory parallel processor system, since the mainstream data flow is not through a shared memory.

Another advantage of the present invention is that the number of processing nodes in a data processing system is easily scalable. A graphics processing system manufacture in accordance with a preferred embodiment of the present invention may be easily scaled up or down by adding or removing processing nodes without the necessity of changing the software or circuitry.

A further advantage of the present invention is that a multiplexed graphics data stream, containing several graphics data streams, each having a different graphics data format, may be processed concurrently on several different nodes. For example, in a four processing node system, three processing nodes may be utilized to process a GL data stream while a fourth is processing an X Windows data stream, or all four processing nodes may be employed to process independent GL data streams.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for processing a graphics data stream, said data processing system having a plurality of processing nodes and a graphics display device, said method comprising:
   partitioning a graphics data stream into a plurality of data segments for processing by said plurality of processing nodes;
   attaching a plurality of tags to said plurality of data segments, wherein said plurality of tags indicate an order of said plurality of data segments;
   distributing said plurality of data segments for processing to said plurality of processing nodes;
   in response to receiving a data segment at one of said plurality of processing nodes, processing said data segment to produce a processed data segment;
   recombining a plurality of processed data segments processed by said plurality of processing nodes to produce a processed graphics data stream, wherein said plurality of processed data segments are recombined according to said order indicated by said plurality of tags; and
   coupling said processed graphics data stream to said graphics display device.

2. The method of claim 1, wherein said partitioning of said graphics data stream and said distributing said plurality of data segments is performed by a processor.

3. The method of claim 1, wherein said plurality of processing nodes consists of two processing nodes.

4. The method of claim 1, wherein said graphics data stream is a multiplexed graphics data stream including a plurality of graphics data formats.

5. The method of claim 1, wherein a selected number of said plurality of processing nodes is utilized to process said plurality of data segments.

6. The method of claim 1, wherein each of said plurality of processing nodes in said processing step comprises a plurality of serially coupled processors.

7. The method of claim 1, wherein said step of distributing said plurality of data segments for processing to said plurality of processing nodes includes distributing each of said plurality of data segments to a processing node in said plurality of processing nodes that is free for processing a data segment.

8. A data processing system having a plurality of processing nodes and a graphics display device for processing a graphics data stream, said data processing system comprising:
   partitioning means for partitioning a graphics data stream into a plurality of data segments for processing by a plurality of processing nodes;
   distributing means for distributing said plurality of data segments for processing to said plurality of processing nodes, wherein said distribution means includes means for attaching a synchronization tag to a data segment within said plurality of data segments before said data segment is distributed to a processing node within said plurality of processing nodes, wherein said synchronization tag indicates an order in which a processed data segment is to be recombined with other processed data segments in a plurality of processed data segments;
   processing means for processing said plurality of data segments to produce a plurality of processed data segments in response to receiving said plurality of data segments at said plurality of processing nodes;
   recombining means, coupled to said graphics display device, for recombining said plurality of processed data segments processed by said plurality of processing nodes into a processed graphics data stream; and
   coupling means for coupling said processed graphics data stream to said graphics display device.

9. The data processing system of claim 8, wherein said partitioning means and said distribution means comprises a processor.

10. The data processing system of claim 8, wherein said graphics data stream is a multiplexed graphics data stream including a plurality graphics data formats.

11. The data processing system of claim 8, wherein each of said plurality of processing nodes comprises a plurality of serially coupled processors.

12. The data processing system of claim 8, wherein a number of processing nodes within said plurality of processing nodes is selected to process said plurality of data segments.

13. The data processing system of claim 8, wherein said recombining means comprises an application specific integrated circuit, wherein said application specific integrated circuit searches said plurality of processed data segments for synchronization tags to determine the order in which to reorder said plurality of processed data segments into a processed data stream.

14. The data processing system of claim 8, wherein said distributing means distributes each of said plurality of data segments to a processing node in said plurality of processing nodes that is free for processing a data segment.

15. A graphics processing system for efficiently processing a graphics data stream, said graphics processing system having a plurality of processing nodes for processing said graphics data stream, said graphics processing system comprising:

control means comprising partitioning means for partitioning a graphics data stream into a plurality of work groups for processing in response to receiving said graphics data stream and distribution means for distributing said plurality of work groups for processing after partitioning said graphics data stream into said plurality of work groups;

processing means coupled to said distribution means comprising a plurality of processing nodes for processing said plurality of work groups, wherein a plurality of processed work groups is created by processing said plurality of work groups;

recombination means coupled to said plurality of processing nodes for recombining said plurality of processed work groups into a processed graphics data stream; and storage means coupled to said plurality processing nodes, for storing attribute data wherein said plurality of processing nodes process a work group with respect to attributes preceding that work group and wherein said control means further comprises copying means, coupled to said storage means, for copying attribute data from said graphics data stream into said storage means.

16. The data processing system of claim 15, wherein each of said plurality of processing nodes comprises a plurality of serially coupled processors.

17. The data processing system of claim 15, wherein said distribution means and said processing means are coupled through a shared memory area.

18. The data processing system of claim 15, wherein a number of said plurality of processing nodes is selected for processing said plurality of work groups.

19. The graphics processing system of claim 15, wherein said distribution means distributes each of said plurality of work groups to a processing node in of said plurality of processing nodes that is free for processing a work group.

20. A graphics processing system for efficiently processing a graphics data stream, said graphics processing system having a plurality of processing nodes for processing said graphics data stream, said graphics processing system comprising:

control means comprising partitioning means for partitioning a graphics data stream into a plurality of work groups for processing in response to receiving said graphics data stream and distribution means for distributing said plurality of work groups for processing after partitioning said graphics data stream into said plurality of work groups, wherein said control means includes means for attaching a synchronization tag to a work group before distributing said work group to a processing node, wherein said synchronization tag indicates an order in which a work group is to be recombined with other work groups in said plurality of work groups after processing by said plurality of processing means;

processing means coupled to said distribution means comprising a plurality of processing nodes for processing said plurality of work groups, wherein a plurality of processed work groups is created by processing said plurality of work groups; and recombination means coupled to said plurality of processing nodes for recombining said plurality of processed work groups into a processed graphics data stream.

21. The data processing system of claim 20, wherein said recombining means further comprises means for detecting said synchronization tags attached to each of said plurality of processed work groups and recombining each of said plurality of processed work groups with other processed work groups in said plurality of processed work groups in said order indicated by said synchronization tags.

22. The data processing system of claim 21, wherein said graphics data stream is a multiplexed graphics data stream including a plurality graphics data formats.

* * * * *